United States Patent [19]
Justus

[11] Patent Number: 6,161,470
[45] Date of Patent: Dec. 19, 2000

[54] PERMANENT FILTER FOR THE PREPARATION OF TEA IN POTS OR CUPS

[75] Inventor: Christian Justus, Hamburg, Germany

[73] Assignee: Reinsch & Held (GmbH & Co.), Hamburg, Germany

[21] Appl. No.: 09/364,508

[22] Filed: Jul. 30, 1999

[30] Foreign Application Priority Data

Aug. 1, 1998 [DE] Germany ............... 298 13 791 U

[51] Int. Cl.⁷ .................................................. A47J 31/06
[52] U.S. Cl. .................. 99/319; 99/321; 99/322; 99/323; 219/474; 219/477
[58] Field of Search ............... 99/317, 318, 319, 99/321, 322; 210/473, 474, 477

[56] References Cited

U.S. PATENT DOCUMENTS

| | | | |
|---|---|---|---|
| 5,363,745 | 11/1994 | Lin | 99/317 X |
| 5,775,204 | 7/1998 | Link et al. | 99/299 |

FOREIGN PATENT DOCUMENTS

| | | | |
|---|---|---|---|
| 444288 | 3/1936 | France | 99/322 |
| 892525 | 8/1953 | Germany | 99/321 |
| 197 22 320 A1 | 12/1998 | Germany . | |
| 298 13 775 U1 | 12/1998 | Germany . | |
| 508745 | 1/1955 | Italy | 99/322 |
| 369823 | 3/1932 | United Kingdom . | |

Primary Examiner—Reginald L. Alexander
Attorney, Agent, or Firm—Merchant & Gould P.C.

[57] ABSTRACT

The invention concerns a permanent filter for the preparation of tea in pots or cups, consisting of a filter housing with an upper, ring shaped rim (1) and a fluid permeable straining fabric (3). The special feature of the invention consists in the fact that provision is made in the upper rim (1) for one or more openings (5) for receiving a tab (7) of a lid (6).

9 Claims, 5 Drawing Sheets

PERMANENT FILTER FOR THE PREPARATION OF TEA IN POTS OR CUPS

TECHNICAL FIELD

The invention concerns a permanent filter for the preparation of tea in pots or cups, consisting of a filter housing with an upper ring-shaped rim and a liquid permeable straining fabric.

BACKGROUND

Such known permanent filters display a more or less cylindrically shaped, liquid permeable filter housing consisting of a suitable mesh fabric. This mesh fabric starts at the upper rim and, if need be, is stiffened and supported by longitudinal struts.

SUMMARY

The known permanent filters are inserted in pots or cups, in the process of which they should take up a position that is the most favorable to the correct brewing of the tea. This position is dependent on the dimensions of the tea filter and those of the lid or the opening of the pot. If the pot or the cup is to be closed up by a lid, this closing up is frequently influenced in a negative way by the interposing of the tea filter. The lid does not sit correctly and tightly in the actual intended position. This holds true especially when the lid, as in the case of many teapots, displays a tab that prevents its falling off during the pouring. Designing a recess on a permanent filter is already known, through which recess the tab of the lid passes. This recess, however, does not hold the lid. The filter cannot be removed with or through the lid.

The invention is thus based on the task of creating a permanent filter, of the type named in the introduction, on which the lid of the teapot or the filter's own lid is held securely at the predetermined place; at the same time, a universal application of the permanent filter to cups and pots of different sizes should be possible.

This task is accomplished in a permanent filter of the type named in the introduction by the fact that provision is made in the upper rim for one or more openings, preferably one or more transversely running slots, for receiving the tab of a lid.

By the fact that provision is made on the upper rim for openings, into which the tab of the lid of a teapot or of the filter's own lid fits, the lid is held on the permanent filter. The filter, by virtue of its downward reaching cylindrical form, sits securely and firmly in the pot or the cup from the start.

By means of an adapter ring, which can display a variable outer diameter, it is possible to adapt the permanent filter to differently sized pots or teacup openings. Such a design of the adapter ring, incidentally, also forms an independent aspect of the invention.

A special adapter, having the shape of a funnel, makes possible a deeper insertion of the tea filter, in particular into a teapot. By combining this funnel shaped adapter with an adapter ring, the insertion depth of the permanent filter can be influenced.

The lid can be either a lid belonging to the permanent filter and also serving as an drip pan, the lid having a tab whose form is adapted to the opening, or else it is a matter of the lid of the teapot. Several differently dimensioned openings in the rim of the permanent filter make possible the combination with differently shaped tabs of different lids.

DESCRIPTION OF THE DRAWINGS

In the following, the invention is explained in greater detail by aid of some implementation examples, with reference to the drawings.

They show.

DETAILED DESCRIPTION

Figure 1:
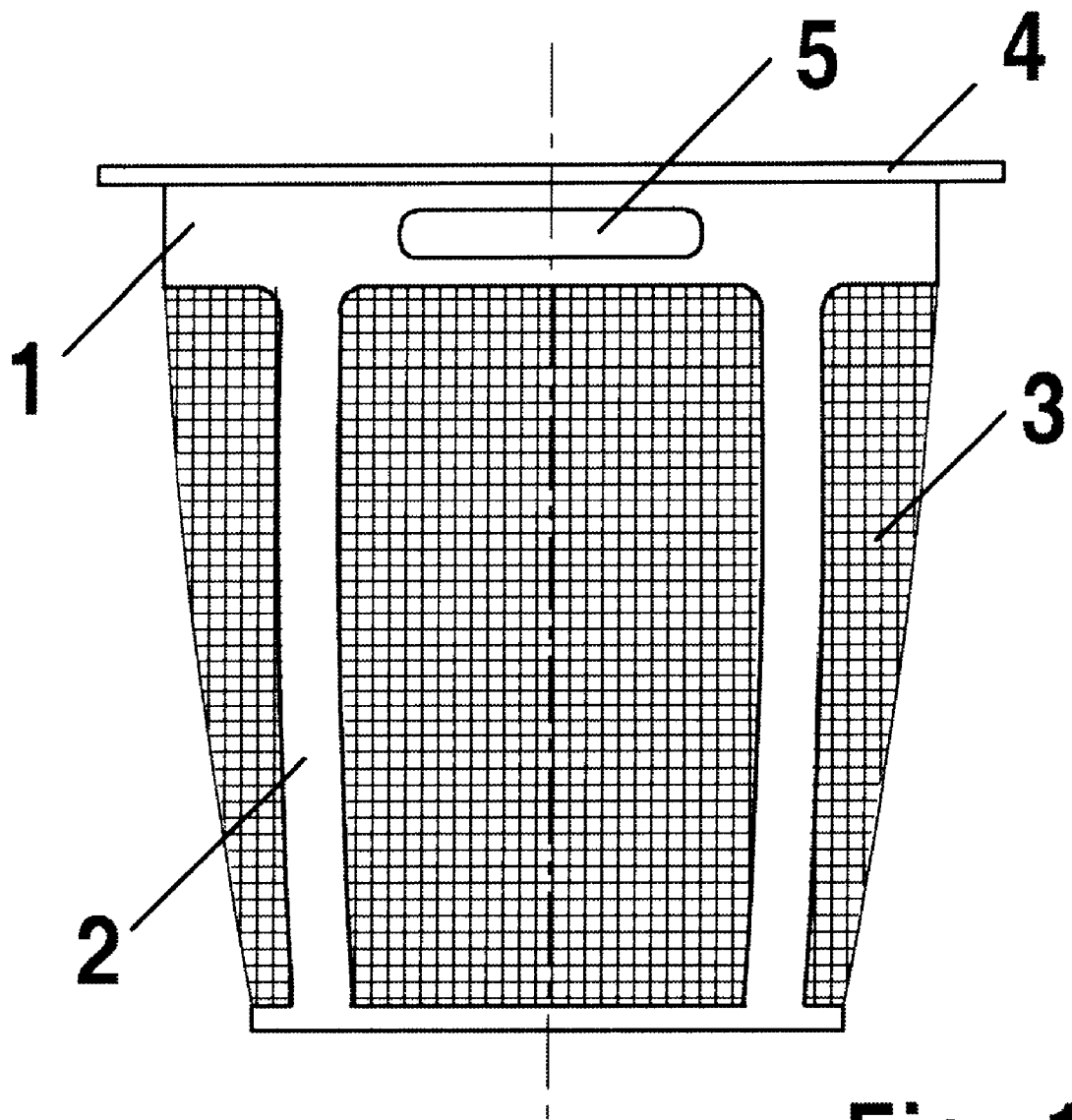
FIG. 1: a side view of an implementation form of a permanent filter according to the invention

Represented in FIG. 1 is a permanent filter that has the same fundamental form as a known filter. It consists of an essentially cylinder shaped filter housing that, in the downward direction, is tapered somewhat. At the top is located a pipe shaped rim 1, from which the longitudinal struts 2 run to a base. The filter fabric, which is also located in the region of the base, is indicated with numeral 3.

Provision is made at the opening of the upper rim 1 for a flange 4, which displays a somewhat greater diameter.

Formed in the upper rim 1 is a transversely running slot 5. Provision can be made for several slots of different sizes in the upper rim. These slots serve to receive the tab of a lid, in particular of an existing teapot into which the permanent filter is placed.

Figure 2:
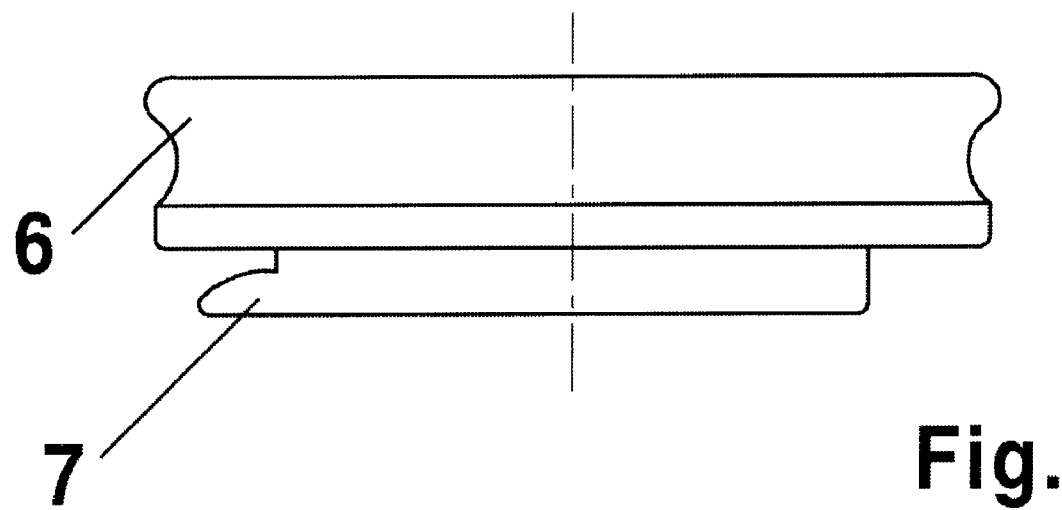
FIG. 2: a side view of a lid that can also be used as a drip pan

However, the permanent filter can also be combined with its own lid 6, as represented in FIG. 2. This lid displays a tab 7 that fits into the slot 5. This lid serves at the same time as a drip pan, when it has been set down in an inverted manner.

It can be readily perceived that the tab 7 of the lid 6 or of a lid of a pot fits into the slot 5 and is held securely by the latter. If a lid of a pot is secured in a slot 5, then it sits tightly and the total appearance of the teapot is not significantly altered.

Figure 3:
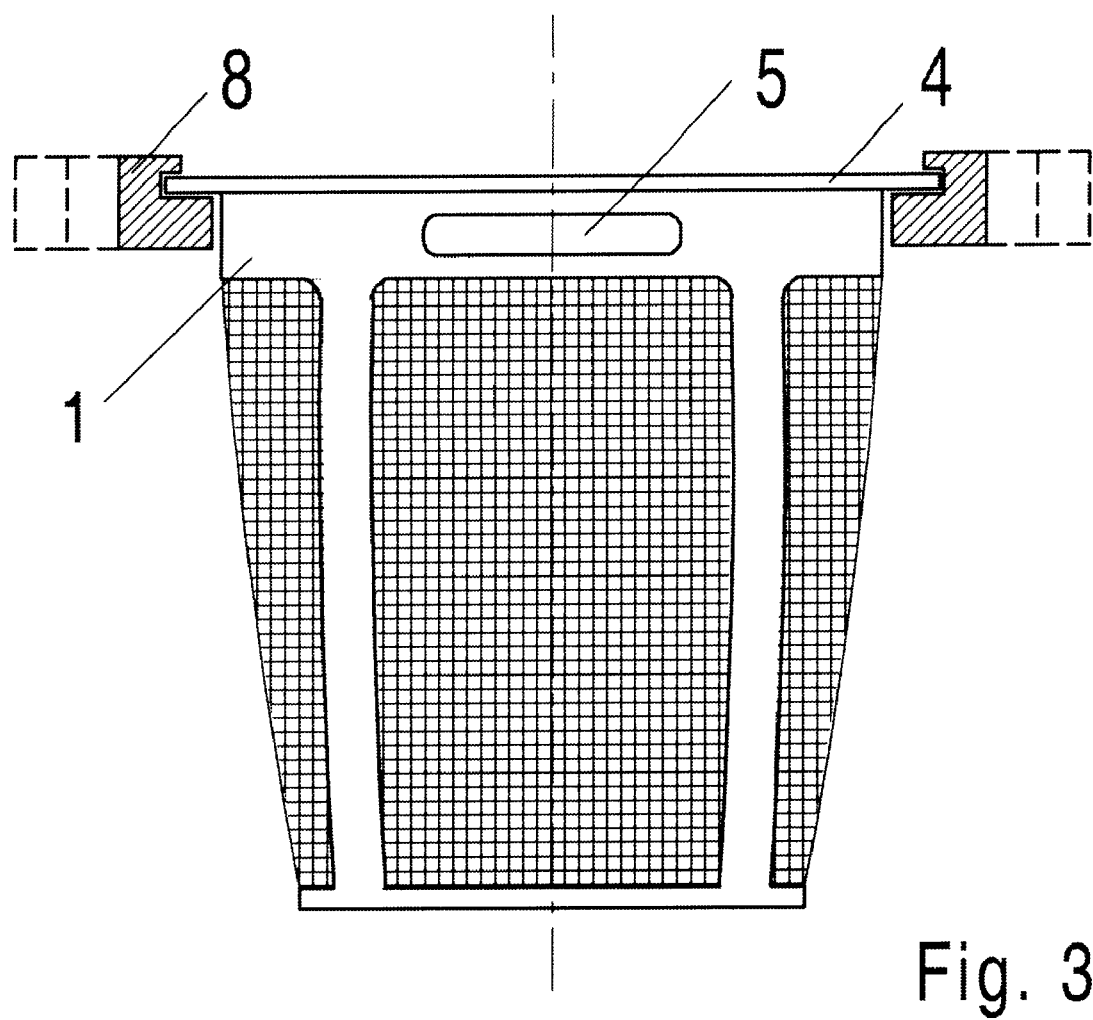
FIG. 3: a side view corresponding to FIG. 1, but with an adapter ring

Represented in FIG. 3 is an adapter ring 8, which, as indicated by dashed lines, can have a variable outer diameter. This adapter ring is attached to the rim 1, in this implementation form by being placed onto the flange 4. The elastic material property of the adapter ring allows it to be snapped onto the flange 4.

Figure 4:
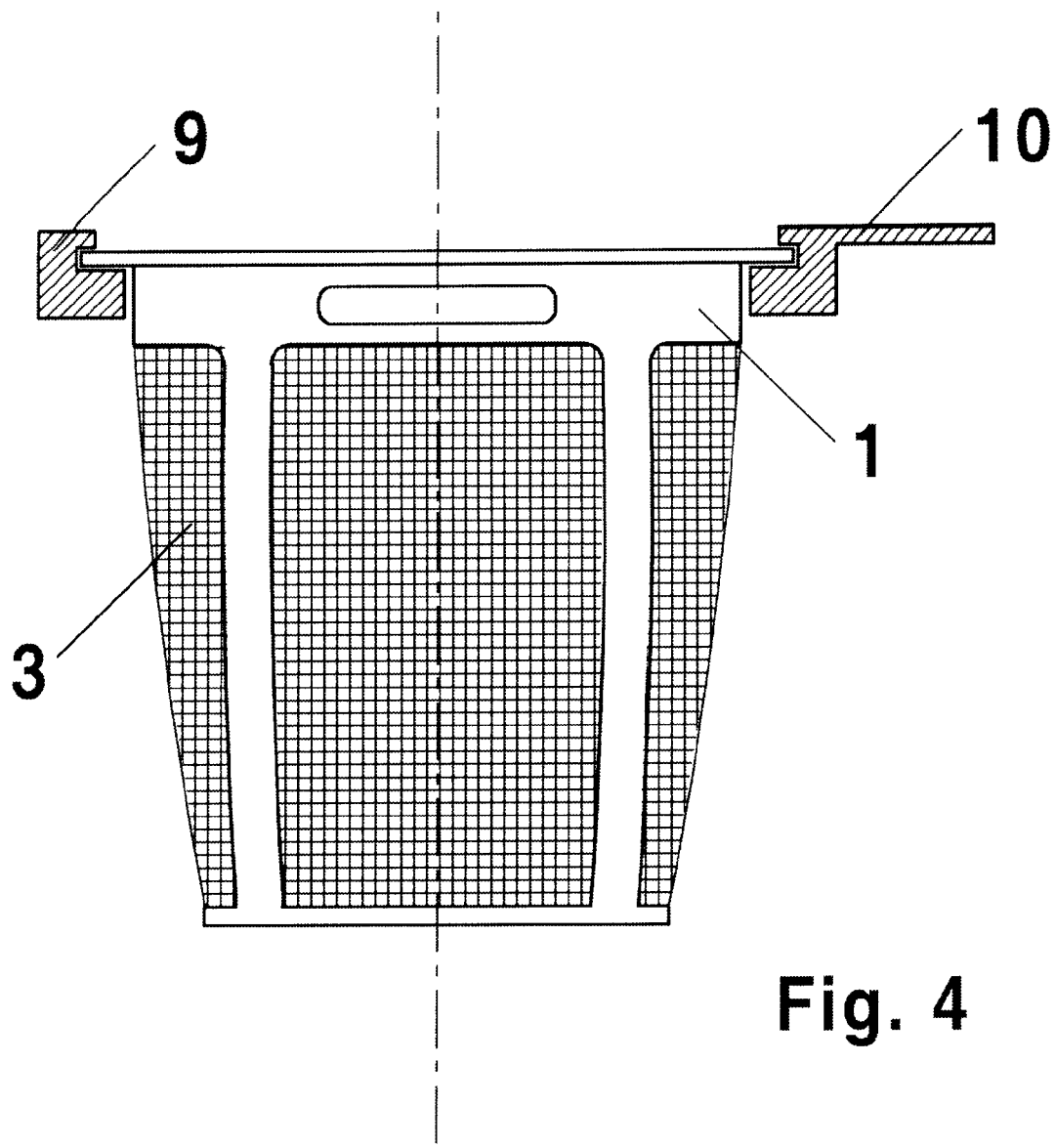
FIG. 4: a side view corresponding to FIG. 3, but with a different adapter ring

The adapter ring 9 in the implementation form according to FIG. 4 is designed and attached in a similar manner. This adapter ring 9 displays a hand grip 10.

Figure 5:
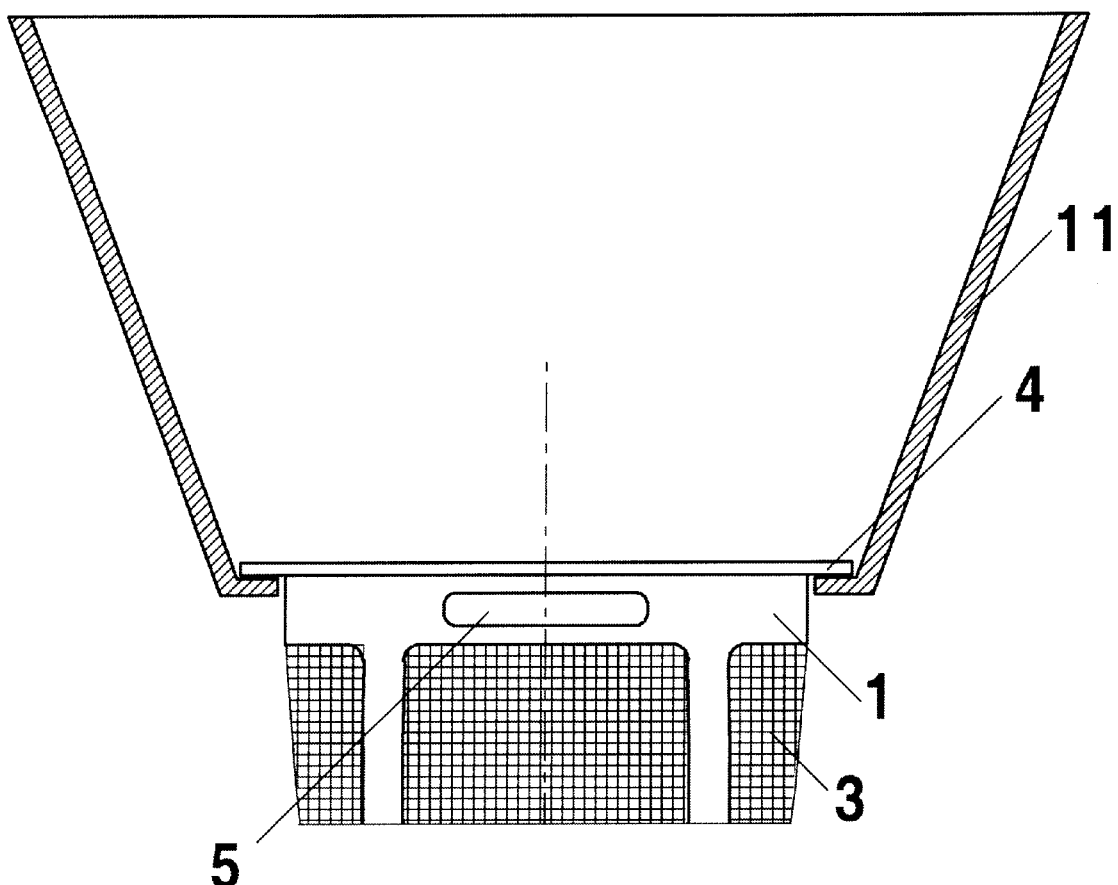
FIG. 5: a side view of the upper part of a permanent filter with a funnel shaped adapter

In the implementation form according to FIG. 5, a funnel shaped adapter 11 is attached to the upper rim 1. The tea filter is installed in this funnel shaped adapter 11 by insertion from above.

Not shown is the combination of an adapter ring 8 with the funnel shaped adapter 11. However, it can be readily seen that when an adapter ring 8 is placed onto the rim 1 of the permanent filter, the latter does not sink as low into the funnel shaped adapter 11 as is shown in FIG. 5. The depth of insertion is reduced depending on the outer diameter of the adapter ring 8. By this means, an adaptation to different sizes of teapots is possible.

What is claimed is:

1. A permanent filter for the preparation of tea in a container, the permanent filter comprising:
    a liquid-permeable straining fabric; and
    a ring-shaped member adapted to selectively support a lid having a tab and to support the liquid-permeable straining fabric in the container, the ring-shaped member connected to an upper portion of the liquid-permeable straining fabric, the ring-shaped member defining one or more holes, the holes being arranged to selectively receive the tab of the lid.

2. The permanent filter of claim 1 wherein the holes are formed as slots.

3. The permanent filter of claim 1 wherein the ring-shaped member defines a plurality of holes, at least one hole having a first dimension and at least a second hole having a second dimension.

4. The permanent filter of claim 1 further comprising a lid, the lid forming a drip pan and having a tab for selectively engaging the hole.

5. The permanent filter of claim 1 wherein the ring-shaped member has a diameter, the permanent filter further comprising an adapter ring for enlarging the diameter.

6. The permanent filter of claim 5 further comprising a holding grip connected to the adapter ring.

7. The permanent filter of claim 1 further comprising a funnel-shaped adaptor connected to the ring-shaped member.

8. The permanent filter of claim 7 wherein at least a portion of the permanent filter is inserted through the funnel-shaped adapter, the permanent filter further comprising an adapter ring arranged to reduce the insertion depth of the permanent filter through the funnel-shaped adapter.

9. The permanent filter of claim 8 further comprising flange projecting outward from the ring-shaped member, the flange arranged to engage the funnel-shaped adapter and the adapter ring.

* * * * *